United States Patent Office 3,036,107
Patented May 22, 1962

3,036,107
10-PHENOXARSINYL PERFLUOROALKANOATES
Joseph E. Dunbar, Midland, Mich., assignor to The Dow Chemical Company, Midland, Mich., a corporation of Delaware
No Drawing. Filed Dec. 19, 1960, Ser. No. 76,452
4 Claims. (Cl. 260—440)

This invention is directed to the 10-phenoxarsinyl perfluoroalkanoates containing not in excess of 30 carbon atoms. These compounds are characterized by the formula

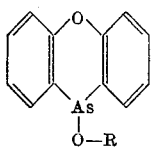

In this and succeeding formulae, R represents a perfluoroalkanoyl radical containing not to exceed 18 carbon atoms. These compounds are liquid or crystalline solid materials which are somewhat soluble in many common organic solvents and of very low solubility in water. The compounds are useful as parasiticides and are adapted to be employed as active toxicants of compositions for the control of ascarids, mite, insect, bacterial and fungal organisms such as ticks, aphids, beetles, worms and *Rhizoctonia solani*. The compounds are also useful as herbicides for the control of a number of undesirable grass and weed species.

The compounds of the present invention may be prepared by reacting 10,10'-oxybisphenoxarsine with a perfluoroalkanoic acid (ROH). Representative acids include perfluoroacetic acid, perfluoropentanoic acid, perfluoroheptanoic acid, perfluorooctanoic acid, perfluorodecanoic acid, perfluoromyristic acid, perfluoropalmitic acid and perfluorostearic acid. The reaction conveniently is carried out in the presence of an inert organic liquid as reaction medium such as toluene, benzene or xylene as reaction medium. The amounts of the reagents to be employed are not critical, some of the desired products being obtained when employing any proportion of the reactants. In the preferred method of operation, good results are obtained when employing about one molecular proportion of the 10,10'-oxybisphenoxarsine with about two molecular proportions of the perfluoroalkanoic acid reactants. The reaction takes place smoothly at the temperature range of from 20° to 150° C. with the production of the desired product and water of reaction. Conveniently, the reaction may be carried out at the boiling temperature of the reaction mixture. In carrying out the reaction, the 10,10'-oxybisphenoxarsine and acid reactant are mixed and contacted together in any convenient fashion and the resulting mixture thereafter maintained for a period of time in the reaction temperature range to complete the reaction.

Upon completion of the reaction, any reaction medium may be removed from the reaction mixture by evaporation or distillation under reduced pressure to obtain the desired product as a residue. The latter may be further purified by conventional procedures such as washing, extraction and recrystallization.

The following examples merely illustrate the invention and are not to be construed as limiting.

*Example 1.—10-Phenoxarsinyl Trifluoroacetate*

10,10'-oxybisphenoxarsine (30.1 grams; 0.06 mole) and 13.8 grams (0.12 mole) of perfluoroacetic acid were dispersed in 500 milliliters of benzene and the resulting mixture heated with stirring for one hour at the boiling temperature. The heating was carried out with distillation of the water of reaction as formed together with some of the solvent, separation of the water and recycling of the solvent. The benzene was then removed from the reaction mixture by evaporation under vacuum and the residue recrystallized from nitromethane. As a result of these operations, there was obtained a 10-phenoxarsinyl trifluoroacetate product melting at 129°–131° C. and having carbon and fluorine contents of 47.30 and 15.9 percent, respectively, as compared to theoretical contents of 47.22 and 16.01 percent.

*Example 2.—10-Phenoxarsinyl Pentafluoropropionate*

10,10'-oxybisphenoxarsine (37.6 grams; 0.075 mole) and 24.6 grams (0.15 mole) of perfluoropropionic acid were dispersed in 500 milliliters of benzene and the resulting mixture heated with stirring for 45 minutes at the boiling temperature. The heating was carried out with distillation of the water of reaction as formed together with some of the solvent, separation of the water and recycling of the solvent. The benzene was then removed from the reaction mixture by evaporation under vacuum and the residue dissolved in methylcyclohexane. The methylcyclohexane solution was then treated at the boiling temperature with decolorizing charcoal and thereafter filtered and allowed to cool to room temperature. During the cooling, a 10-phenoxarsinyl pentafluoropropionate product precipitated in the mixture as a crystalline solid. This product was separated by decantation and found to melt at 106°–108.5° C. and to have carbon and fluorine contents of 44.2 and 23.3 percent, respectively, as compared to theoretical contents of 44.36 and 23.39 percent.

*Example 3.—10-Phenoxarsinyl Heptafluorobutyrate*

10,10'-oxybisphenoxarsine (37.6 grams; 0.075 mole) and 32.1 grams (0.15 mole) of heptafluorobutyric acid were dissolved in 500 milliliters of benzene and the resulting mixture heated with stirring for 30 minutes at the boiling temperature. The heating was carried out with distillation of the water of reaction as formed together with some of the solvent, separation of the water and recycling of the solvent. The benzene was then removed from the reaction mixture by evaporation under vacuum and the residue recrystallized from methylcyclohexane. As a result of these operations, there was obtained a 10-phenoxarsinyl heptafluorobutyrate product as a crystalline solid. This product melted at 93°–95° C. and had carbon and fluorine contents of 42.35 and 29.4 percent, respectively, compared to theoretical contents of 42.13 and 29.16 percent.

The novel compounds of the present invention are useful as parasiticides for the control of a number of pests and the inhibition of the growth of a number of weed and plant species. Representative compounds include the 10-phenoxarsinyl perfluorohexanoate, perfluoroheptanoate, perfluorooctanoate, perfluorodecanoate, perfluorotetradecanoate, perfluorohexadecanoate and perfluorooctadecanoate. For such uses, the products may be dispersed on an inert finely divided solid and employed as dusts. Such mixtures may also be dispersed in water with or without the aid of a surface active agent and employed as sprays. In other procedures, the products may be employed as active constituents in solvent solutions, oil-in-water or water-in-oil emulsions, or aqueous dispersions. In representative operations, aqueous compositions containing 500 parts per million by weight of 10- phenoxarsinyl perfluoroacetate give excellent controls of southern army worms, nematodes, crab grass, salvinia, algae and *Alternaria solani*. In further operations, the compounds of the present invention are found of outstanding value for the preservation of wood, paints and adhesives.

The perfluoroalkanoic acids employed as starting materials in accordance with the present teachings may be prepared in known procedures by the electrolysis of the corresponding alkanoic acids or alkanoic acid anhydrides in liquid hydrogen fluoride, whereby there are obtained the perfluoroalkanoyl fluorides. The perfluoroalkanoyl fluorides are readily hydrolyzed to the corresponding perfluoroalkanoic acids. The 10,10'-oxybisphenoxarsine as employed in accordance with the present teachings may be prepared in known procedures by treating 10-chlorophenoxarsine with ammonium hydroxide in ethanol as reaction medium.

That which is claimed is:
1. A compound characterized by the formula

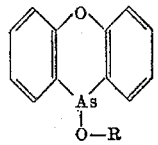

wherein R represents a perfluoroalkanoyl radical containing up to and including 18 carbon atoms.
2. 10-phenoxarsinyl trifluoroacetate.
3. 10-phenoxarsinyl pentafluoropropionate.
4. 10-phenoxarsinyl heptafluorobutyrate.

References Cited in the file of this patent
FOREIGN PATENTS
F 14431 IVc–120    Germany _____ Sept. 29, 1955